United States Patent
Bhogal et al.

(10) Patent No.: US 10,318,812 B2
(45) Date of Patent: Jun. 11, 2019

(54) AUTOMATIC DIGITAL IMAGE CORRELATION AND DISTRIBUTION

(71) Applicant: International Business Machines Corporation, Armonk, NY (US)

(72) Inventors: Kulvir S. Bhogal, Fort Worth, TX (US); Rick A. Hamilton, II, Charlottesville, VA (US); Yin Xia, Beijing (CN); Yu Lin Zhai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 15/187,862

(22) Filed: Jun. 21, 2016

(65) Prior Publication Data

US 2017/0364749 A1    Dec. 21, 2017

(51) Int. Cl.
*G06K 9/00* (2006.01)
*H04L 12/58* (2006.01)

(52) U.S. Cl.
CPC ..... *G06K 9/00677* (2013.01); *G06K 9/00288* (2013.01); *H04L 51/10* (2013.01); *H04L 51/32* (2013.01)

(58) Field of Classification Search
CPC ..... G06K 9/00288; G06K 2009/00328; G06K 2209/27; G06K 9/00147; G06K 9/00248; G06K 9/00268; G06K 9/00295; G06K 9/00677; G06K 9/0288
See application file for complete search history.

(56) References Cited

U.S. PATENT DOCUMENTS

| | | | |
|---|---|---|---|
| 8,520,907 B2 | 8/2013 | Lai | |
| 8,670,597 B2 | 3/2014 | Petrou et al. | |
| 8,798,401 B1 | 8/2014 | Johnson et al. | |
| 8,831,275 B2 | 9/2014 | Goldberg | |
| 9,053,368 B2 | 6/2015 | Chou et al. | |
| 9,104,984 B2 | 8/2015 | Mardell | |
| 9,152,849 B2 | 10/2015 | Ganong et al. | |
| 9,729,865 B1* | 8/2017 | Kuo | G06K 9/00268 |
| 2009/0285488 A1* | 11/2009 | Li | G06K 9/00261 382/190 |

(Continued)

FOREIGN PATENT DOCUMENTS

| | | |
|---|---|---|
| JP | 2007102683 A | 4/2007 |
| JP | 2014191767 A | 10/2014 |
| KR | 1020140135320 A | 11/2014 |

OTHER PUBLICATIONS

Campbell; "Apple invention automatically shares photos based on facial recognition data"; Aug. 13, 2015; 7 pages; <http://appleinsider.com/articles/15/08/13/apple-invention-automatically-shares-photos-based-on-facial-recognition-data>.

(Continued)

*Primary Examiner* — Kenny A Cese
(74) *Attorney, Agent, or Firm* — Anthony M. Pallone

(57) ABSTRACT

Embodiments of the present invention provide systems and methods for image correlation and distribution. The method includes receiving an image depicting at least one person, metadata for the image, contact data, facial recognition data, and location data. The method further includes analyzing the image and other data, and determining the identity of people in the image based on the facial recognition data and the location data.

20 Claims, 5 Drawing Sheets

(56) References Cited

U.S. PATENT DOCUMENTS

| | | | |
|---|---|---|---|
| 2011/0131241 A1* | 6/2011 | Petrou | G06F 17/30861 |
| | | | 707/770 |
| 2012/0242043 A1* | 9/2012 | Hong | F41J 3/02 |
| | | | 273/348 |
| 2012/0328169 A1 | 12/2012 | Heeter et al. | |
| 2015/0085146 A1* | 3/2015 | Khemkar | H04N 7/147 |
| | | | 348/207.1 |
| 2015/0227782 A1* | 8/2015 | Salvador | G06K 9/00221 |
| | | | 382/118 |
| 2015/0319217 A1 | 11/2015 | Shakib et al. | |
| 2016/0050171 A1 | 2/2016 | Salvador et al. | |
| 2017/0078454 A1* | 3/2017 | Berookhim | G06K 9/00288 |

OTHER PUBLICATIONS

Taherimakhsousi et al.; "Location-based Face Recognition Using Smart Mobile Device Sensors"; Proceedings of the International Conference on Computer and Information Science and Technology; May 11-12, 2015; Paper No. 111; pp. 111-1-111-6; Ottawa, Ontario, Canada.

Vazquez-Fernandez et al.; "Built-In Face Recognition for Smart Photo Sharing in Mobile Devices"; © 2011 IEEE; 4 pages.

"Automatic Real-Time Photo Distribution for Mobile Devices"; An IP.com Prior Art Database Technical Disclosure; IP.com No. IPCOM000245318D; Feb. 29, 2016; pp. 1-4.

* cited by examiner

| | 305 | 306 | 307 | 308 | 309 |
|---|---|---|---|---|---|
| | FACIAL INFORMATION | NAME | EMAIL | SOCIAL MEDIA ACCOUNTS | PREFERRED IMAGE TRANSMISSION METHOD |
| 301 | (face) | JENNIFER | JENNIFER@ABC.COM | JENNIFERLEE | EMAIL |
| 302 | (face) | PETER | PETER@ABC.COM | GREATPETER | SOCIAL MEDIA |
| 303 | (face) | MIKE | MIKE@ABC.COM | MIKE | EMAIL |
| 304 | (face) | MARY | MARY@ABC.COM | MARY | SOCIAL MEDIA |

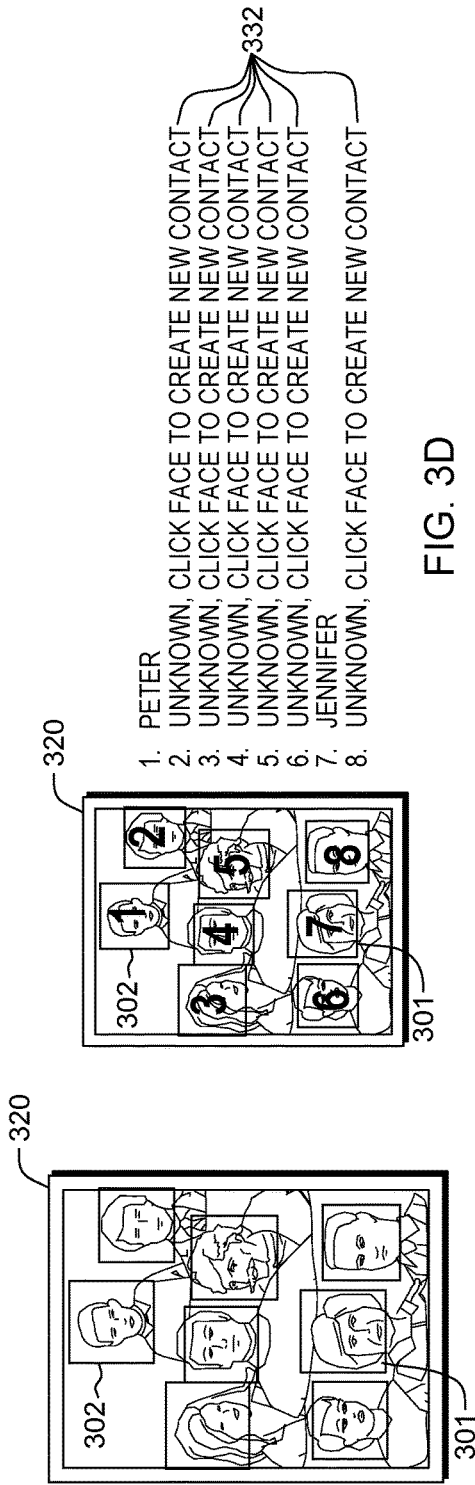
FIG. 3C
FIG. 3D
1. PETER
2. UNKNOWN, CLICK FACE TO CREATE NEW CONTACT
3. UNKNOWN, CLICK FACE TO CREATE NEW CONTACT
4. UNKNOWN, CLICK FACE TO CREATE NEW CONTACT
5. UNKNOWN, CLICK FACE TO CREATE NEW CONTACT
6. UNKNOWN, CLICK FACE TO CREATE NEW CONTACT
7. JENNIFER
8. UNKNOWN, CLICK FACE TO CREATE NEW CONTACT
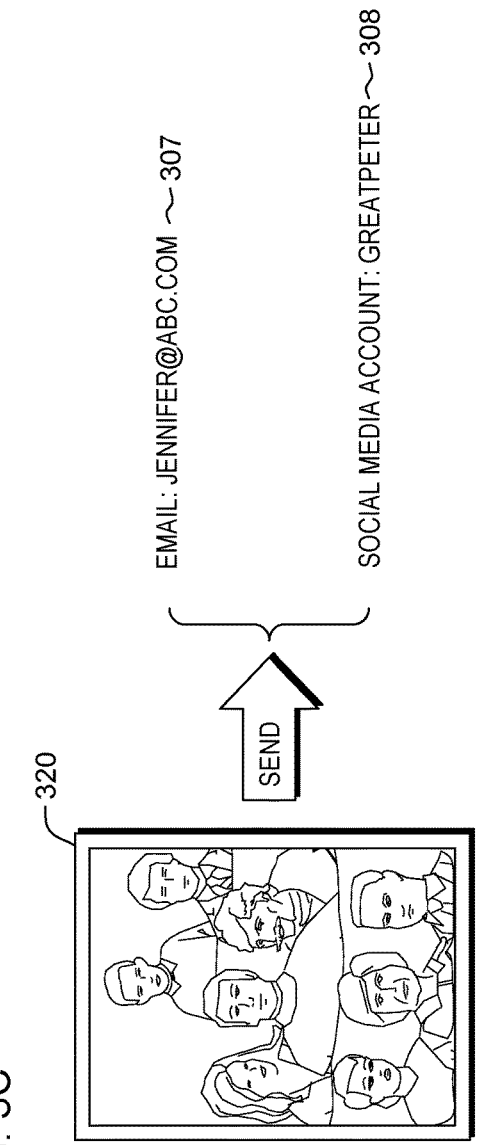
EMAIL: JENNIFER@ABC.COM ~307
SOCIAL MEDIA ACCOUNT: GREATPETER ~308
FIG. 3E

AUTOMATIC DIGITAL IMAGE CORRELATION AND DISTRIBUTION

BACKGROUND OF THE INVENTION

The present invention relates generally to the field of digital images, and more particularly to the recognition of people in, and automatic distribution of, digital images, using location data and facial recognition.

Digital imaging has become increasingly popular as more and more electronic devices come standard with built-in, high quality digital image capturing equipment. Any person who takes a digital image, hereafter labeled with the generic terms "photographer" or "user", often enjoys sharing the image they have taken with the people in the image, through such ways as social media, email, or texts. However, it is generally up to the photographer to manually determine, each time, such things as who is in the image, who they would like to share the image with, and how they want to share the image.

SUMMARY

According to one embodiment of the present invention, a method for image correlation and distribution is provided, the method comprising: receiving, by one or more processors, an image depicting at least one person, and a plurality of associated data comprising: metadata for the image, a set of contact data, a set of facial recognition data, and a set of location data; analyzing, by one or more processors, the image and the plurality of associated data; and determining, by one or more processors, an identity of one or more people in the image, wherein the identity is determined, in part, by the set of location data and the set of facial recognition data.

According to another embodiment of the present invention, a computer program product for image correlation and distribution is provided, based on the method described above.

According to another embodiment of the present invention, a computer system for image correlation and distribution is provided, based on the method described above.

BRIEF DESCRIPTION OF THE DRAWINGS

FIGS. 3C and 3D depict an example of image correlation and facial recognition, in accordance with an embodiment of the present invention;

FIG. 3E depicts an example of an automatic distribution method, in accordance with an embodiment of the present invention.

DETAILED DESCRIPTION

Digital imaging has seen a boom in popularity, as more and more electronic devices come standard with built-in, high quality, digital image capturing equipment. Virtually everyone with a cell phone, tablet, or some other electronic device has, at some point, taken a digital image with one of these devices, and has thus become a photographer. These photographers often enjoy sharing the images they take with the people in the images.

Currently, if a photographer chooses to share the images they have taken, such as via social media, they undertake a manual process to do so. The photographer indicates to the device or program which person's image in a photo they intend to tag, and then select a name associated with that person. As facial recognition software improves, the software may suggest a person to be tagged, such as "would you like to tag your sister, Mary, in this image?" Some embodiments of the present invention recognize the following potential problems and/or potential areas of improvement with respect to the current state of the art: (i) multiple contacts may have similar features (e.g., a contact has a sibling with extremely similar facial features, and the facial recognition software is unable to distinguish which sibling is which); (ii) when sharing images with contacts via a digital communications service, the photographer must manually choose a contact, remember what the contact's preferred method is, and, using that information, manually choose the contact's email, phone number, or other communication method; and (iii) contacts may have multiple phone numbers, email addresses, instant messaging application accounts, social media accounts, and other contact methods to choose from, making the process more complicated. Embodiments of the present invention provide systems and methods for facial recognition in a digital image, using facial recognition software and location data, and, once the correlation has been made, the automatic transmission of the digital image to one or more people in the digital image.

Figure 1:
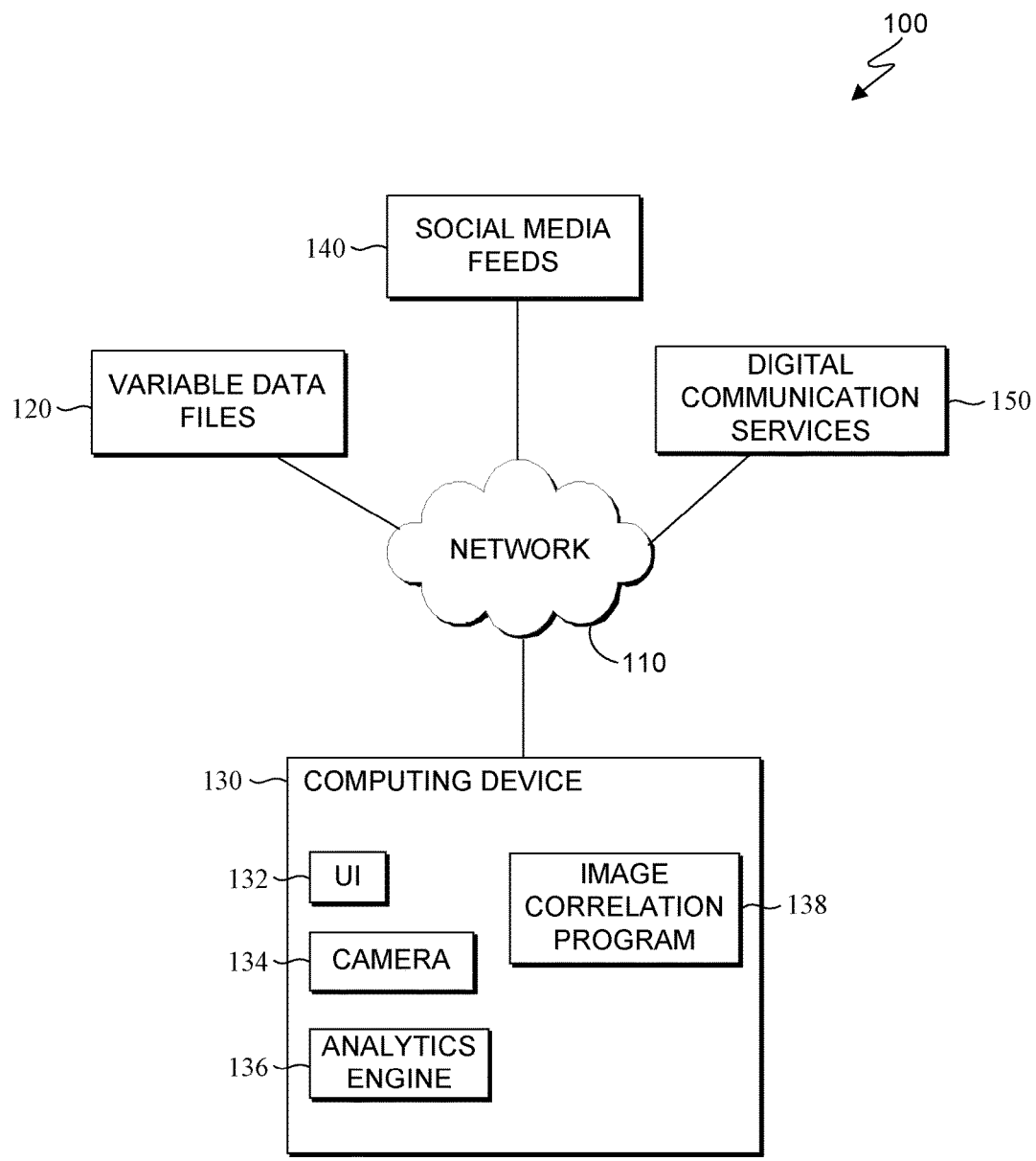
FIG. 1 is a functional block diagram illustrating a data processing environment, in accordance with an embodiment of the present invention.

The present invention will now be described in detail with reference to the figures. FIG. 1 is a functional block diagram illustrating a data processing environment, generally designated 100, in accordance with an embodiment of the present invention. Modifications to data processing environment 100 may be made by those skilled in the art without departing from the scope of the invention as recited by the claims. In an exemplary embodiment, data processing environment 100 includes variable data files 120, computing device 130, social media feeds 140, and digital communication services 150, all interconnected over network 110.

Network 110 can be, for example, a local area network (LAN), a wide area network (WAN) such as the Internet, or a combination of the two, and can include wired, wireless, or fiber optic connections. In general, network 110 can be any combination of connections and protocols that will support communication and/or access between variable data files 120, computing device 130, social media feeds 140, and digital communication services 150.

Variable data files 120, in accordance with an embodiment of the present invention, may include, but are not limited to: contact information, such as a cloud-based or synced address book with contacts, emails, addresses, phone numbers, genders, names, birthdays, instant messaging application accounts, and social media accounts; location data for both the photographer and the photographer's contacts, from various sources such as Bluetooth, Wi-Fi, global positioning systems (GPS), social media sites, mobile networks, and device sensors; and facial recognition data, such as a gallery of images of the photographer's contacts, as well as images of other people, and templates and data on facial features. In this exemplary embodiment, variable data files 120 are stored remotely, such as on a server (not depicted), and may be accessed via network 110. In other embodiments, variable data files 120 may be stored locally, such as on computing device 130, or may be stored in a combination of local and remote storage methods.

Computing device 130 includes user interface (UI) 132, camera 134, analytics engine 136, and image correlation program 138. In various embodiments of the present invention, computing device 130 can be a laptop computer, a tablet computer, a netbook computer, a personal computer (PC), a desktop computer, a personal digital assistant (PDA), a smart phone, a thin client, or any programmable electronic device capable of executing computer readable program instructions. Computing device 130 may include internal and external hardware components, as depicted and described in further detail with respect to FIG. 4.

UI 132 may be, for example, a graphical user interface (GUI) or a web user interface (WUI) and can display text, documents, web browser windows, user options, application interfaces, and instructions for operation, and includes the information (such as graphic, text, and sound) a program presents to a user and the control sequences the user employs to control the program. UI 132 is capable of receiving data, user commands, and data input modifications from a user. UI 132 is also capable of communicating with camera 134, analytics engine 136, and image correlation program 138.

In this exemplary embodiment, camera 134 is any combination of hardware and software that performs such operations as: recording images in digital form by converting an optical image to an electrical signal, storing the digital image data and metadata, and allowing for options such as viewing, editing, or manipulating digital images, digital image data, and digital image metadata.

Analytics engine 136 is a predictive analytics engine capable of aggregating and analyzing various types of data associated with digital images, facial recognition, locations, and contact information. The types of data associated with facial recognition may include: previous images taken for the purpose of facial recognition, digital image galleries, and general information on human faces (e.g., average distances between features, hair color, eye color, various facial expressions, etc.). The types of data associated with locations may include, but is not limited to: GPS, Wi-Fi, Bluetooth, social media, and mobile network data, and device sensor data such as point-to-point radio frequency (RF) queries. The location data may be for the photographer location, and/or for the location of the photographer's contacts. In an exemplary embodiment, analytics engine 136 is capable of: (i) aggregating and analyzing data associated with digital images, facial recognition, location data, and contact information; and (ii) storing and distributing the data and analysis as requested. In various embodiments, analytics engine 136 and image correlation program 138 may be separate programs, or may be included in a single program.

Image correlation program 138 is a software application capable of receiving information from, and sending information to, sources such as variable data files 120, camera 134, analytics engine 136, social media feeds 140 (e.g., social networking websites), and digital communication services 150. Digital communication services 150 may include, but are not limited to: email, Short Message Services (SMS), Multimedia Messaging Services (MMS), and web-based messaging applications. Although depicted as a separate component in one embodiment, image correlation program 138 may be partially or fully integrated with UI 132. In this exemplary embodiment, image correlation program 138 is capable of retrieving and sending information via network 110. The capabilities of image correlation program 138 may include, but are not limited to: sending data to, receiving data from, and performing analysis on data received from such sources as variable data files 120, camera 134, analytics engine 136, social media feeds 140, and digital communication services 150; determining the location of the person taking the image; determining the location of one or more contacts of the person taking the image; determining facial recognition for one or more people in the image; and transmitting the image automatically based on the preferred method of transmission.

Figure 2:
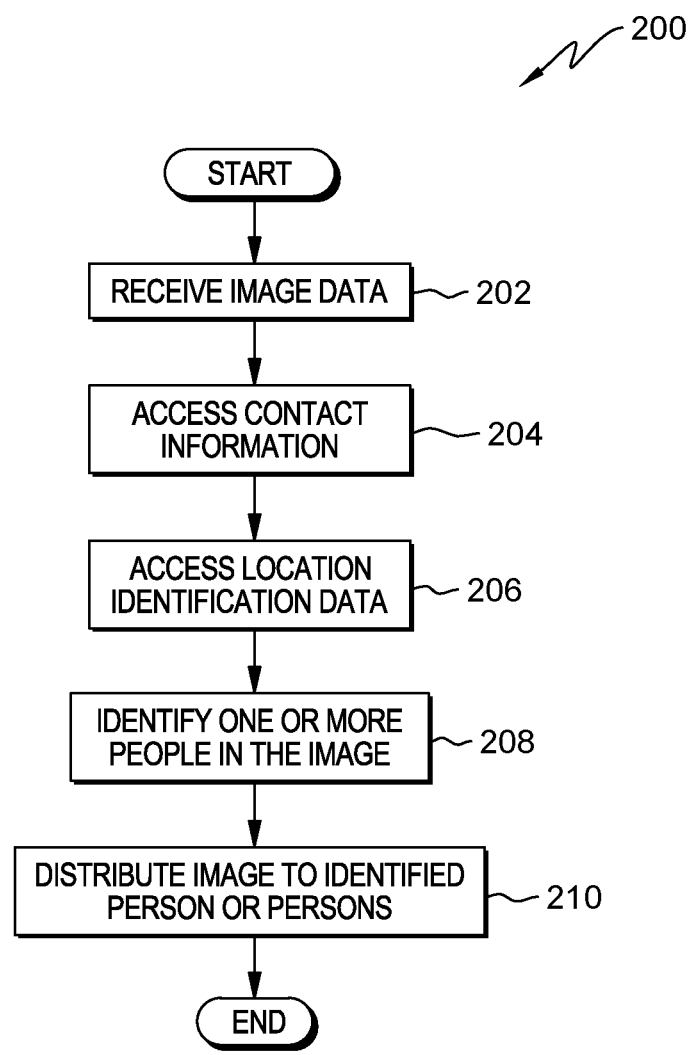
FIG. 2 is a flowchart illustrating operational steps for correlating and transmitting an image to a contact, in accordance with an embodiment of the present invention.

FIG. 2 is a flowchart 200 illustrating operational steps for correlating and transmitting an image to a contact, in accordance with an embodiment of the present invention.

In step 202, image correlation program 138 receives image data. In this exemplary embodiment, image data includes the image, raw image data, and image metadata. In this embodiment, image correlation program 138 receives the image, raw image data, and image metadata from such sources as variable data files 120, social media feeds 140, camera 134, and analytics engine 136.

In step 204, image correlation program 138 accesses the contact information of the photographer's contacts. In this exemplary embodiment, the contact information can include, but is not limited to: facial information used by the facial recognition software to identify a person; basic address information, such as a contact's name, gender, birthday, phone numbers, addresses, social media accounts, and email addresses; and ways to transmit images, such as email, cloud storage services, social media accounts, instant messaging application accounts, and digital communication services.

In step 206, image correlation program 138 accesses location data. In an exemplary embodiment, image correlation program 138 accesses and analyzes the location data to first determine the location of the photographer, at the time the image was taken. Image correlation program 138 then accesses and analyzes the location data in order to identify which of the photographer's contacts were in the vicinity of the photographer when the image was taken. In an exemplary embodiment, location data is determined via a mobile device (i.e., through cell towers, GPS, or social media accounts geotagging or check-in features) such as a mobile telephone, tablet, or wearable electronic device. In some embodiments, the location data may be stored internally on the mobile device, or externally, such as on a cloud-based service, or a combination of internally and externally, and image correlation program 138 may query the internal and external storage locations, as necessary.

In step 208, image correlation program 138 identifies one or more people in the image. In an exemplary embodiment, image correlation program 138 automatically identifies the human face(s) in the image, raw image data, and image metadata, using a combination of the facial recognition software and the location data, including the location data identifying the photographer's contacts who were in the vicinity of the photographer when the image was taken (i.e., step 206). Using the location data to identify which contacts are in the vicinity, image correlation program 138 may identify one or more people in the image faster and with a higher degree of accuracy than with facial recognition software alone. In this embodiment, the location data is a primary or secondary means of correlating a face to a person. For example, if a photographer has two sisters, sister X and sister Y, as listed contacts, and the sisters look very similar, the facial recognition software may be unable to clarify which sister is in the image or may choose the incorrect sister. In this example, sister X and sister Y are candidate persons for identification. Image correlation program 138 determines through location data that only one sister, sister X, was in the vicinity of the photographer when the image was taken. Through this additional step, image correlation program 138 is able to determine that the person in the image is sister X, with a higher degree of accuracy than by the facial recognition software alone. Any persons in the image not identified through location data identification are identified using the facial recognition software. In an additional embodiment, image correlation program 138 allows the photographer to create contact data for any person in the image that the program is unable to identify (i.e., photographer can manually add contact information to the photographer's set of contact data for one or more people the program was unable to identify).

In step 210, image correlation program 138 distributes the image to the identified person or persons. In an exemplary embodiment, image correlation program 138 automatically distributes the image to the identified person or persons in the image, according to a predefined, preferred image transmission method (e.g., only sends images to the contact's social media account when the photographer is on Wi-Fi). This preferred image transmission method may be predefined by the photographer or the contact, and may be stored in such places as in apps on the local computing device, on a cloud-based or synced address book, or in image correlation program 138. This image transmission method may include any of digital communication services 150 and/or social media feeds 140.

Figures 3A, 3B:
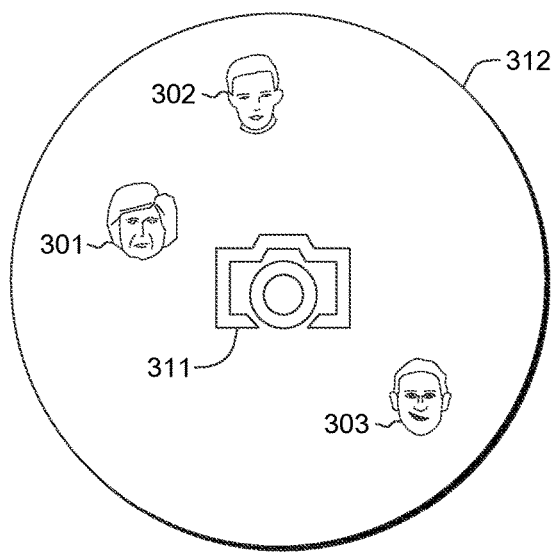
FIG. 3A depicts an example of a set of preset contact data, in accordance with an embodiment of the present invention.
FIG. 3B depicts an example of an area that a device can capture as a digital image and location data for contacts within that area, in accordance with an embodiment of the present invention.

FIG. 3A depicts an example of a photographer's contact data that image correlation program 138 receives, in accordance with an embodiment of the present invention. In the embodiment, the photographer has four contacts, Jennifer 301, Peter 302, Mike 303, and Mary 304. Each of the four contacts includes facial information 305 (i.e., an image of the contact's face), name 306, email 307, social media account 308, and preferred image transmission method 309. Additional contact data in other embodiments may include, but is not limited to: phone numbers, addresses, instant messaging accounts, other social media accounts, other contact information, other location data, and other identifying features for a contact.

FIG. 3B depicts an example of an area that a device can capture as a digital image and location data for contacts within the area, in accordance with an embodiment of the present invention. Image correlation program 138 identifies which of the photographer's contacts are located within vicinity 312 when the image was taken. Vicinity 312 encompasses the area device 311 can capture as a digital image. In various embodiments, the area that vicinity 312 encompasses may change, depending on such things as the abilities of the photographer, the abilities of device 311 taking the digital image, and the preset preferences of the photographer. In FIG. 3A there are four contacts in the photographer's contact data. In this exemplary embodiment, the location data places only three of the photographer's contacts, Jennifer 301, Peter 302, and Mike 303, within vicinity 312 when the image was taken.

FIGS. 3C and 3D depict an example of image correlation and facial recognition, in accordance with an embodiment of the present invention. Image correlation program 138 determines who is in image 320, using facial recognition data and location data, in accordance with an embodiment of the present invention. In an exemplary embodiment, image correlation program 138 accesses the image, the raw image data, and the image metadata, to identify one or more people in image 320 using the location data of FIG. 3B and the facial recognition data, such as facial information 305 from FIG. 3A. In the example depicted by FIGS. 3C and 3D, image correlation program 138 identifies Jennifer 301 and Peter 302 as the only contacts from the photographer's contact data that are both in vicinity 312 when image 320 was taken (i.e., FIG. 3B), and are in image 320 itself (i.e., FIG. 3C). In some embodiments, for any one or more people in image 320 that image correlation program 138 is unable to identify, an option is presented to the photographer, such as options 332 (i.e., "unknown, click face to create new contact"), to add contact data for one or more of the unidentified people.

FIG. 3E depicts an example of an automatic distribution method, in accordance with an embodiment of the present invention. Image correlation program 138 automatically transmits image 320 to the contacts identified through facial recognition and location data, through preferred image transmission method 309. In an exemplary embodiment, image correlation program 138 utilizes preferred image transmission method 309 to determine whether image 320 should be sent using email 307 or social media account 308. In this embodiment, image 320 is transmitted to Jennifer 301 through email 307, and to Peter 302 through social media account 308. In various embodiments, once the transmission preference is identified, image 320 will be sent to the contact according to preset timing rules. The preset timing rules may include, for example: only when the photographer is on Wi-Fi, at the earliest opportunity, when the mobile device is otherwise unused, and during a prescribed window of time, such as at noon or between 3 a.m. and 6 a.m. In another embodiment, when one or more people in image 320 are not identified, image correlation program 138 will present the photographer with the option to ignore the unidentified person or persons and not create contacts for those unidentified people, instead sending image 320 only to the known person or persons. In various embodiments, when one or more people in image 320 are identified, but have no preset preferred image transmission method 309, image correlation program will present the photographer with the option to add preferred image transmission method 309 to the contact data in order to send image 320 to the identified person or persons.

Figure 4:
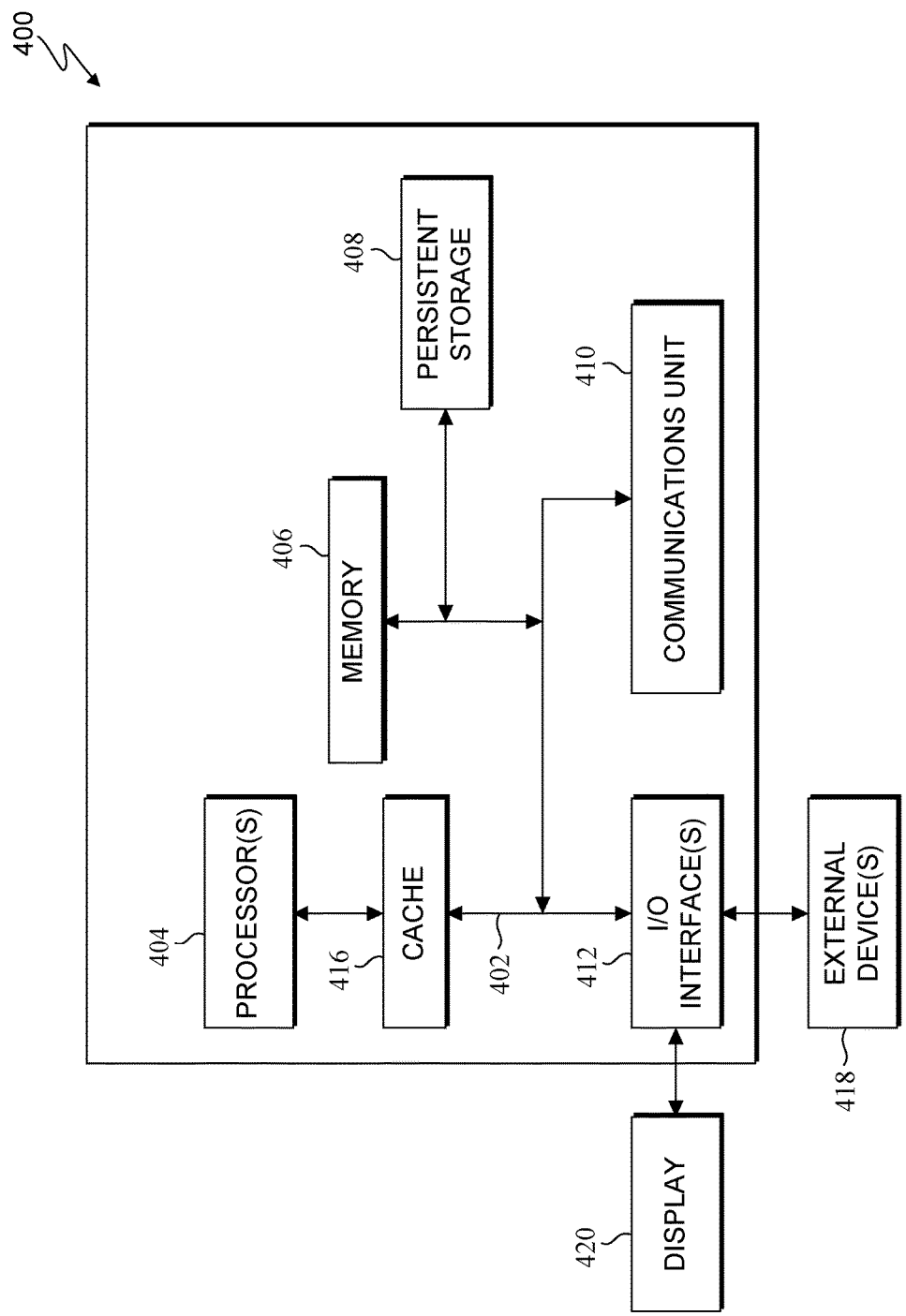
FIG. 4 is a block diagram of internal and external components of the computing device of FIG. 1, in accordance with an embodiment of the present invention.

FIG. 4 is a block diagram of internal and external components of a computer system 400, which is representative of the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to: personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In general, memory 406 can include any suitable volatile or non-volatile computer-readable storage media. Software (e.g., image correlation program 138, etc.) is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 410 provides for communications with other computer systems or devices via a network (e.g., network 110). In this exemplary embodiment, communications unit 410 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computing device 130 through communications unit 410 (e.g., via the Internet, a local area network or other wide area network). From communications unit 410, the software and data can be loaded onto persistent storage 408.

One or more I/O interfaces 412 allow for input and output of data with other devices that may be connected to computer system 400. For example, I/O interface 412 can provide a connection to one or more external devices 418 such as a keyboard, computer mouse, touch screen, virtual keyboard, touch pad, pointing device, or other human interface devices. External devices 418 can also include portable computer-readable storage media such as, for example, thumb drives, portable optical or magnetic disks, and memory cards. I/O interface 412 also connects to display 420.

Display 420 provides a mechanism to display data to a user and can be, for example, a computer monitor. Display 420 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to: an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for image correlation and distribution, the method comprising:
   receiving, by one or more processors, an image depicting one or more persons and a plurality of associated data comprising: metadata for the image, a set of user contact data, a set of facial recognition data, and a set of geographic location data, wherein the image depicting one or more persons is received from a social media data feed;
   analyzing, by one or more processors, the image and the plurality of associated data;
   determining, by one or more processors, an identity of the one or more persons depicted in the image, wherein the identity is determined by the set of facial recognition data and elements of the set of user contact data; and
   in response to the set of facial recognition data being unable to determine an identity of a person depicted in the image from among at least two candidate persons, using the set of geographic location data of the at least two candidate persons and the set of facial recognition data in conjunction with the elements of the set of user contact data to determine, by one or more processors, the identity of the person.

2. The method of claim 1, further comprising:
   automatically distributing, by one or more processors, the image to the one or more people in the image whose identity has been determined, by a preferred image transmission method, wherein the preferred image transmission method is based on the set of user contact data.

3. The method of claim 1, further comprising:
   responsive to determining that at least one of the one or more people in the image is unidentified, generating, by one or more processors, an option to add new contact data for the one or more unidentified people; and
   responsive to receiving new contact data for the one or more unidentified people, updating, by one or more processors, the set of user contact data with the added new contact data for the one or more unidentified people.

4. The method of claim 3, wherein the image is distributed to only the one or more people in the image: whose identity has been determined, and whose set of contact data has been received.

5. The method of claim 2, further comprising:
   receiving, by one or more processors, one or more timing rules detailing predetermined scheduling parameters for the distribution of the image;
   storing, by one or more processors, the received one or more timing rules; and
   automatically distributing, by one or more processors, the image, based in part on the one or more timing rules.

6. The method of claim 1, wherein the set of user contact data comprises: names, addresses, e-mail addresses, genders, birthdays, phone numbers, instant messaging accounts, social media accounts, facial information used by facial recognition software to identify a person, and image transmission methods.

7. The method of claim 1, wherein the set of geographic location data comprises: GPS data, Wi-Fi data, Bluetooth data, social media data, mobile network data, and device sensor data.

8. A computer program product for image correlation and distribution, the computer program product comprising:
   a computer readable tangible storage device, wherein the computer readable tangible storage device is hardware, and program instructions stored on the computer readable tangible storage device, the program instructions comprising:

program instructions to receive an image depicting one or more persons and a plurality of associated data comprising: metadata for the image, a set of user contact data, a set of facial recognition data, and a set of geographic location data, wherein the image depicting one or more persons is received from a social media data feed;

program instructions to analyze the image and the plurality of associated data;

program instructions to determine an identity of the one or more persons depicted in the image, wherein the identity is determined by the set of facial recognition data and elements of the set of user contact data; and in response to the set of facial recognition data being unable to determine an identity of a person depicted in the image from among at least two candidate persons, program instructions to use the set of geographic location data of the at least two candidate persons and the set of facial recognition data in conjunction with the elements of the set of user contact data to determine the identity of the person.

9. The computer program product of claim 8, further comprising:

program instructions to automatically distribute the image to the one or more people in the image whose identity has been determined, by a preferred image transmission method, wherein the preferred image transmission method is based on the set of user contact data.

10. The computer program product of claim 8, further comprising:

responsive to determining that at least one of the one or more people in the image is unidentified, program instructions to generate an option to add new contact data for the one or more unidentified people; and program instructions to, responsive to receiving new contact data for the one or more unidentified people, update the set of user contact data with the added new contact data for the one or more unidentified people.

11. The computer program product of claim 10, wherein the image is distributed to only the one or more people in the image: whose identity has been determined, and whose set of contact data has been received.

12. The computer program product of claim 9, further comprising:

program instructions to receive one or more timing rules detailing predetermined scheduling parameters for the distribution of the image;

program instructions to store the received one or more timing rules; and program instructions to automatically distribute the image, based in part on the one or more timing rules.

13. The computer program product of claim 8, wherein the set of user contact data comprises: names, addresses, e-mail addresses, genders, birthdays, phone numbers, instant messaging accounts, social media accounts, facial information used by facial recognition software to identify a person, and image transmission methods.

14. The computer program product of claim 8, wherein the set of geographic location data comprises: GPS data, Wi-Fi data, Bluetooth data, social media data, mobile network data, and device sensor data.

15. A computer system for image correlation and distribution, the computer system comprising:

one or more computer processors;

one or more computer readable storage media;

program instructions stored on the one or more computer readable storage media for execution by at least one of the one or more processors, the program instructions comprising:

program instructions to receive an image depicting one or more persons and a plurality of associated data comprising: metadata for the image, a set of user contact data, a set of facial recognition data, and a set of geographic location data, wherein the image depicting one or more persons is received from a social media data feed;

program instructions to analyze the image and the plurality of associated data; and program instructions to determine an identity of the one or more persons depicted in the image, wherein the identity is determined by the set of facial recognition data and elements of the set of user contact data; and in response to the set of facial recognition data being unable to determine an identity of a person depicted in the image from among at least two candidate persons, program instructions to use the set of geographic location data of the at least two candidate persons and the set of facial recognition data in conjunction with the elements of the set of user contact data to determine the identity of the person.

16. The computer system of claim 15, further comprising:

program instructions to automatically distribute the image to the one or more people in the image whose identity has been determined, by a preferred image transmission method, wherein the preferred image transmission method is based on the set of user contact data.

17. The computer system of claim 15, further comprising:

responsive to determining that at least one of the one or more people in the image is unidentified, program instructions to generate an option to add new contact data for the one or more unidentified people; and program instructions to, responsive to receiving new contact data for the one or more unidentified people, update the set of user contact data with the added new contact data for the one or more unidentified people.

18. The computer system of claim 17, wherein the image is distributed to only the one or more people in the image: whose identity has been determined, and whose set of contact data has been received.

19. The computer system of claim 16, further comprising:

program instructions to receive one or more timing rules detailing predetermined scheduling parameters for the distribution of the image;

program instructions to store the received one or more timing rules; and program instructions to automatically distribute the image, based in part on the one or more timing rules.

20. The computer system of claim 15, wherein the set of geographic location data comprises: GPS data, Wi-Fi data, Bluetooth data, social media data, mobile network data, and device sensor data.

* * * * *